(12) United States Patent
Mizuno et al.

(10) Patent No.: US 10,162,137 B2
(45) Date of Patent: Dec. 25, 2018

(54) APPARATUS AND METHOD FOR MOUNTING PHOTOELECTRIC ELEMENT

(71) Applicant: NIPPON MEKTRON, LTD., Tokyo (JP)

(72) Inventors: Toru Mizuno, Tokyo (JP); Hiroshi Ikeda, Tokyo (JP); Tatsunori Otomo, Tokyo (JP); Toshinobu Miyagoshi, Tokyo (JP); Shoji Takano, Tokyo (JP); Fumihiko Matsuda, Tokyo (JP); Garo Miyamoto, Tokyo (JP)

(73) Assignee: NIPPON MEKTRON, LTD., Tokyo (JP)

( * ) Notice: Subject to any disclaimer, the term of this patent is extended or adjusted under 35 U.S.C. 154(b) by 469 days.

(21) Appl. No.: 14/407,578

(22) PCT Filed: Apr. 25, 2013

(86) PCT No.: PCT/JP2013/002801
§ 371 (c)(1),
(2) Date: Dec. 12, 2014

(87) PCT Pub. No.: WO2013/186976
PCT Pub. Date: Dec. 19, 2013

(65) Prior Publication Data
US 2015/0153523 A1   Jun. 4, 2015

(30) Foreign Application Priority Data

Jun. 14, 2012 (JP) ................. 2012-134903

(51) Int. Cl.
*G02B 6/42* (2006.01)

(52) U.S. Cl.
CPC ......... *G02B 6/4221* (2013.01); *G02B 6/4244* (2013.01); *G02B 6/4245* (2013.01); *Y10T 29/49131* (2015.01); *Y10T 29/53178* (2015.01)

(58) Field of Classification Search
CPC .. G02B 6/4221; G02B 6/4222; G02B 6/4227; G02B 6/422; G02B 6/4234; G02B 6/4245
See application file for complete search history.

(56) References Cited

U.S. PATENT DOCUMENTS

| 7,263,248 B2 * | 8/2007 | Windover ............ H05K 1/0274 385/14 |
| 2009/0269704 A1 * | 10/2009 | Hodono ................... G02B 6/13 430/319 |
| 2012/0219251 A1 | 8/2012 | Kuroda et al. |

FOREIGN PATENT DOCUMENTS

| JP | 2003255166 A | 9/2003 |
| JP | 2004-151390 A | 5/2004 |

(Continued)

OTHER PUBLICATIONS

International Search Report dated Jun. 25, 2013 issued in corresponding application No. PCT/JP2013/002801.

(Continued)

*Primary Examiner* — Livius R Cazan
(74) *Attorney, Agent, or Firm* — Westerman, Hattori, Daniels & Adrian, LLP

(57) ABSTRACT

A mounting apparatus for mounting an optical element on a wiring board having a reflecting mirror part of an optical waveguide on its back side comprises a mounting table that supports the wiring board by a holding area, a mounting nozzle that holds the optical element and mounts it on the wiring board, a light source that emits light for illuminating the reflecting mirror part by transmission through the holding area, an image pickup apparatus that captures a transmitted light image of the reflecting mirror part, and a control apparatus that determines a mounting position of the optical element based on the transmitted light image, thereby (Continued)

achieving high density mounting without providing a light introducing part for positioning in mounting the optical axis.

8 Claims, 3 Drawing Sheets

(56) References Cited

FOREIGN PATENT DOCUMENTS

| | | | |
|---|---|---|---|
| JP | 2004151390 A | * | 5/2004 |
| JP | 2007-17559 A | | 1/2007 |
| JP | 2007017559 A | * | 1/2007 |
| JP | 2010-256884 A | | 11/2010 |
| JP | 2010-256885 A | | 11/2010 |
| JP | 2011-85647 A | | 4/2011 |
| WO | 2012/046801 A1 | | 4/2012 |

OTHER PUBLICATIONS

Notification concerning Transmittal of the International Preliminary Report on Patentability (Chapter I of the Patent Cooperation treaty) (Form PCT/IB/326) of International Application No. PCT/JP2013/002801 dated Dec. 24, 2014 with Forms PCT/IB/373, PCT/IB/338 and PCT/ISA/237. (10 pages).
Office Action dated Janauary 5, 2016, issued in Japanese Application No. 2012-134903, with English translation (6 pages).

* cited by examiner

APPARATUS AND METHOD FOR MOUNTING PHOTOELECTRIC ELEMENT

TECHNICAL FIELD

The present invention relates to a mounting apparatus and mounting method for mounting an optical element on a substrate. More particularly, the present invention relates to a mounting apparatus and mounting method for mounting a light receiving or emitting element or the like on a substrate on which an optical waveguide is provided, in a preferably manner.

BACKGROUND ART

With increase in the speed of information transmission of communication devices in recent years, signal transmission using light have been replacing conventional transmission using electrical signals and prevailing widely. Information communication devices using light are adapted to convert an electrical signal into light using a transducer such as a light emitting element, transmit the light to a light receiving element, which is another transducer, through an optical waveguide, and convert the light into an electrical signal again by the light receiving element. The optical waveguide is composed of what is called a core, which mainly transmits light, and what is called a cladding, which surrounds the core.

Actually, according to a method of manufacturing a communication device for optical signals, a light emitting element such as a laser diode is set at a fixed location in such a way as to emit light to the central portion of the core in the direction in which the core extends, and the light receiving element such as a photo diode is set at a fixed position in such a way as to receive light exiting from the central portion of the core in the direction in which the core extends, perpendicularly by its central portion (see patent literature 1). In this case, the accuracy of positioning of the light emitting element and the light receiving element relative respectively to the light entering the core and the light exiting from the core directly affects the intensity of the light signal. Therefore, when the light emitting element and the light receiving element are mounted on a substrate provided with an optical waveguide, the accuracy of mounting is important. In most cases, a reflecting mirror that changes the direction of light is provided between the optical waveguide and the light emitting or receiving element, and what actually matters is the alignment of the reflecting mirror and the light emitting or receiving element. Patent literatures 1 or 2 and 3 disclose methods of preferably aligning the light emitting or receiving element and the optical waveguide.

CITATION LIST

Patent Literature

PTL 1: Japanese Patent Application Laid-Open No. 2007-017559
PTL 2: Japanese Patent Application Laid-Open No. 2010-256884
PTL 3: Japanese Patent Application Laid-Open No. 2010-256885

SUMMARY OF INVENTION

Technical Problem

In the above-described prior arts, light for alignment is introduced into the optical waveguide, and the alignment of the optical waveguide and an element is carried out based on the exiting position of the light. Therefore, it is necessary to provide an introducing part that allows introduction of light for alignment into the optical waveguide. In response to downsizing and improvement in performance of communication apparatuses in nowadays, higher mounting densities of light emitting and receiving elements on a substrate provided with an optical waveguide are needed. However, a problem is that providing the introducing part prevents high density mounting.

The present invention has been made in view of the above described circumstances, and its object is to provide a mounting apparatus and mounting method that enable positioning of a light emitting or receiving element without providing a dedicated light introducing part.

Solution to Problem

To solve the above-described problem, a mounting apparatus according to the present invention for mounting an optical element on a wiring board provided with an optical waveguide having a reflecting mirror part on one side, the optical element being mounted on the other side of the wiring board, is characterized by comprising: a mounting table that supports the wiring board by a holding area; a mounting nozzle that holds the optical element and mounts it on the wiring board; a light source that emits light for illuminating the reflecting mirror part through the holding area of the mounting table; an image pickup apparatus that images a mounting site of the optical element on the wiring board; and control means for determining a mounting position of the optical element based on an image picked up by imaging the reflecting mirror part illuminated by the light source through the mounting table by the image pickup apparatus, wherein the image picked up by the image pickup apparatus is a transmitted light image formed by light illuminating the wiring board through the mounting table transmitted through the reflecting mirror part.

In the above-described mounting apparatus, it is preferred that the image pickup apparatus capture an image by picking up the transmitted light image formed by light transmitted through the reflecting mirror part and a surrounding image formed by light illuminating a portion surrounding the reflecting mirror part. It is also preferred that the holding area be made of a member that can transmit light. Moreover, it is more preferred that the mounting apparatus include a reflecting block that reflects light emitted from the light source to a direction through the reflecting mirror part to enable the image pickup apparatus to pick up an image of the reflecting mirror part. It is more preferred that the mounting apparatus include light diffusing means for changing light emitted from the light source into diffused light before it reaches the reflecting mirror part.

To solve the above-described problem, a mounting method according to the present invention for mounting an optical element on a wiring board provided with an optical waveguide having a reflecting mirror part on one side, the optical element being mounted on the other side of the wiring board, characterized by comprising steps of: holding the wiring board on a mounting table by a holding area; holding the optical element by a mounting nozzle; emitting light for illuminating the reflecting mirror part through the holding area of the mounting table, from a light source; imaging a portion of light transmitted through the reflecting mirror part by an image pickup apparatus to capture an image; and determining a mounting position of the optical element based on an image captured by the image pickup apparatus, wherein the image captured by the image pickup apparatus is a transmitted light image formed by light illuminating the wiring board through the mounting table transmitted through the reflecting mirror part.

Advantageous Effects of Invention

According to the present invention, it is possible to carry out positioning without providing a light introducing part dedicated to positioning of a light emitting or receiving element, and high density mounting can be achieved easily.

DESCRIPTION OF EMBODIMENTS

Figure 1:
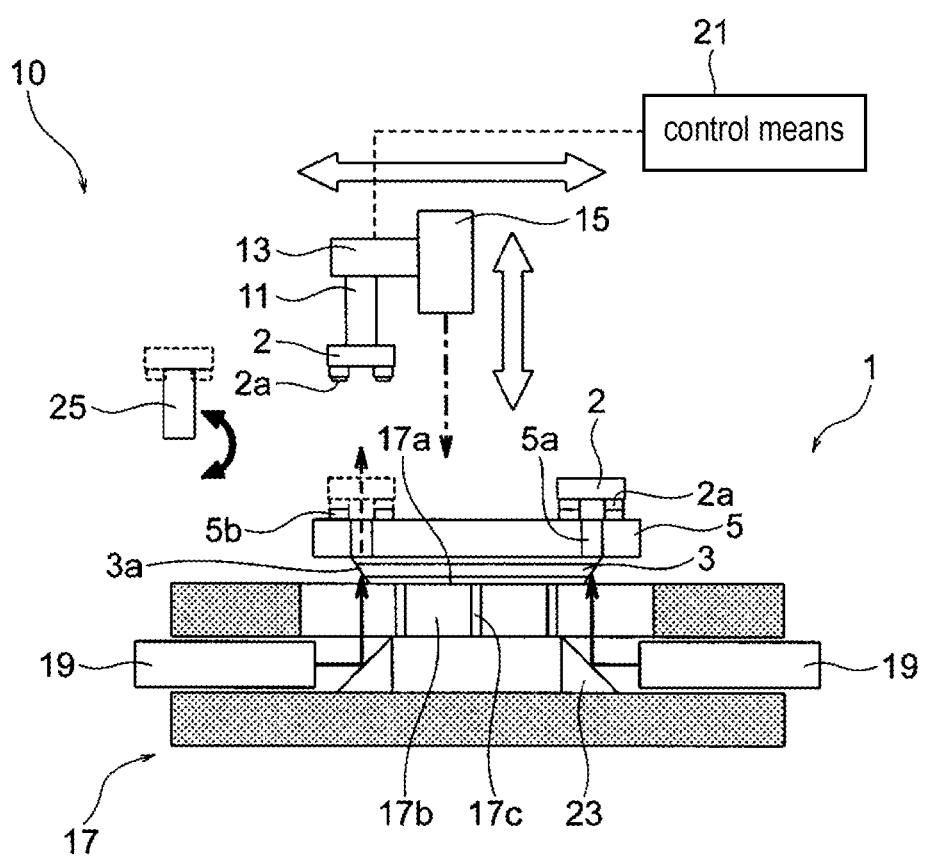
FIG. 1 is a diagram showing a relevant portion of a mounting apparatus according to an embodiment of the present invention in a simplified manner.

In the following, embodiments of the present invention will be described with reference to the drawings. FIG. 1 schematically shows relevant portions of a mounting apparatus according to an embodiment of the present invention, in which a photo electric element chip is mounted on a substrate having an optical waveguide. Firstly, a substrate 1 having an optical waveguide and a chip 2 mounted on the substrate 1 to be processed by the mounting apparatus of this embodiment will be described specifically. The substrate 1 has an optical waveguide 3 and a flexible wiring board 5 (which will be referred to as the wiring board hereinafter). The optical waveguide 3 is fixed on the back side of the wiring board 5.

The wiring board 5 has an optical path hole 5a passing through it in its thickness direction and wiring 5b provided of its front side. The optical waveguide 3 has a reflecting mirror part 3a, which is formed by cutting the end face of the core part of the optical waveguide 3 obliquely at a predetermined angle relative to the direction of transmission of light. The optical path hole 5a in the wiring board 5 is provided at a position that allows light whose direction of transmission has been changed by the reflecting mirror portion 3a to pass through it. In this illustrative case, the chip 2 has electrodes 2a provided on its surface facing the wiring 5b provided on the front side of the wiring board 5. Thus, the wiring board 5 is provided with the optical waveguide 3 having the reflecting mirror part 3a on one side, and the optical element chip 2 is mounted on the other side of the wiring board 5. The chip 2 is positioned in such a way that its light receiving portion or light emitting portion (not shown) is aligned with the center of signal light passing through the optical path hole and then mounted.

Now, an embodiment of the aforementioned mounting apparatus 10 will be described. The mounting apparatus 10 has a mounting nozzle 11, a mounting head 13, a substrate recognition camera 15, a mounting table 17, and a light source 19. The mounting nozzle 11 serves as mounting means that actually holds the chip 2 and actually mounts the chip 2 at a predetermined position on the substrate 1. The mounting head 13 supports the mounting nozzle 11 to shift the mounting nozzle 11 in the XY plane parallel to the mounting surface of the substrate 2 and in the Z direction perpendicular to the XY plane by means of a driving apparatus not shown in the drawings.

The mounting nozzle 11 and the mounting head 13 may employ various features of mounting nozzles used in known mounting apparatuses. The substrate recognition camera 15 is supported by the mounting head 13 with the mounting nozzle 11. The operation of holding and releasing the chip 2 by the mounting nozzle 11, driving of the mounting head 13, the operation of mounting chip 2, and imaging of the optical path hole 5a by the substrate recognition camera 15 and other operations are performed by control means 21 connected to them.

The mounting table 17 has a holding area 17a that can hold the wiring board 5 by suction on its front side. The holding area 17a has a region that can transmit light emitted from the light source 19. In the embodiment shown in FIG. 1, the light source 19 emits visible light, and the entirety of the holding area 17a is made of a transparent member 17b that can transmit visible light. The transparent member 17b is provided with a substrate suction holes 17c that pass through it from its back side to front side. The wiring board 5 is sucked by the substrate suction hole 17c through a vacuum channel (not shown) arranged on the back side and thereby held in the holding area 17a. The light source 19 is arranged on the back side of the transparent member 17b, and the direction of illumination with visible light is changed by a reflecting block 23 also arranged on the back side, so that the visible light transmits through the transparent member 17b and exits to the front side.

The reflecting block 23 is set beforehand at an appropriate position relative to the position of the optical path hole 5a in the wiring board 5 in the held state. With this arrangement, visible light emitted from the light source 19 reaches the reflecting mirror part 3a via the reflecting block 23 and the transparent member 17b, and a portion of the visible light transmitted through the reflecting mirror part 3a passes through the optical path hole 5a and exits to the front side of the wiring board 5. The substrate recognition camera 15 picks up the light exiting from the optical path hole 5a. The control means 21 determines the center of the intensity of the visible light exiting from the optical path hole 5a in the plane perpendicular to the optical axis from the picked up image or determines the geometrical center of the reflecting mirror part 3a from the image.

The exiting path of the visible light coincides with the path of optical signals which travel through the optical waveguide 3 and whose traveling direction is deflected toward the optical path hole 5a by the reflecting mirror part 3a. In consequence, the center of intensity or the geometrical center determined as above coincides with the center of intensity of the signal light obtained from the optical waveguide. Therefore, the chip 2 is mounted on the wiring board 5 in such a way that the center of the element is aligned with the center of intensity as described above. The mode of determining the mounting position of the chip 2 on the wiring board 5 using the above-described mounting table 17 enables positioning the chip 2 without need to provide a light introducing part dedicated to positioning of the light emitting and receiving elements, which is a cause of a problem in prior arts.

Figure 2:
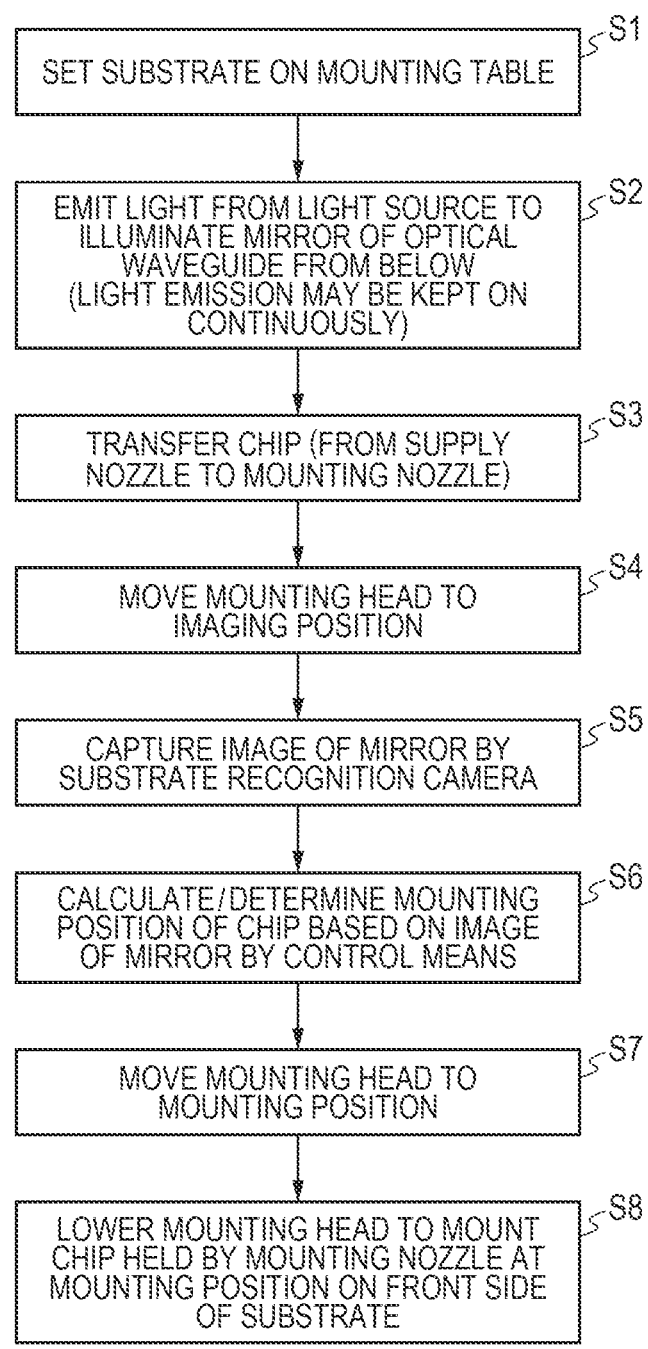
FIG. 2 is a flow chart of a mounting method according to an embodiment of the present invention.

Next, a mounting method actually using the mounting apparatus 10 will be described. FIG. 2 is a chart showing the operational flow of processing steps in the mounting method. Firstly in step S1, the wiring board 5 is placed at a predetermined position on the mounting table 17. Then in step S2, the light source 19 is caused to emit light to illuminate the reflecting mirror part 3a from below the transparent member 17b. The light emission from the light source 19 is not turned on and off as required in the mounting process, but the light emission may be kept on continuously. After or during the above-described process, the chip 2 is transferred from a chip supply nozzle 25, which supports the chip 2 by its side having the electrodes 2a to the mounting nozzle 11 (step S3), so that the chip 2 is held by the mounting nozzle 11. After the completion of the transfer, in step 4, the mounting head 13 is moved to shift the substrate recognition camera 15 to a position at which it can take an image of the optical path hole 5a, which is located at the mounting position of the chip 2 it holds.

After the movement is stopped, in step S5, an image of the reflecting mirror part 3a illuminated by visible light is captured by the substrate recognition camera 15. More specifically, a transmitted light image is captured with light transmitted through the reflecting mirror part 3a. In step S6, the aforementioned center of intensity is determined by the control means 21 on the basis of the image of the reflecting mirror part 3a thus captured. Furthermore, the mounting position of the chip 2 is calculated and determined. Based on the mounting position thus determined, the mounting head 13 is moved in step S7. After the movement of the mounting head 13 is stopped, the mounting nozzle 11 is lowered, and the chip 2 is mounted at a predetermined position on the front side of the wiring board 5.

Figure 3:
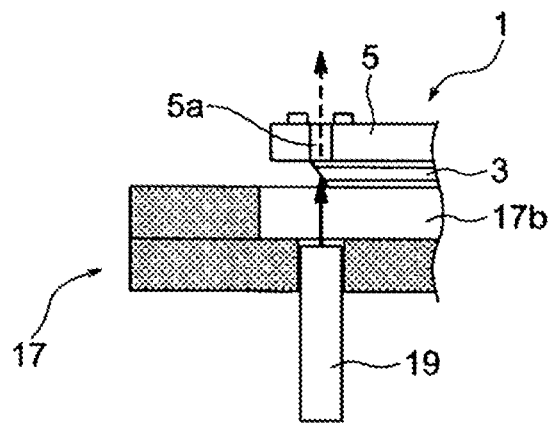
FIG. 3 is a diagram showing a relevant portion of a mounting apparatus according to another embodiment of the present invention.

Another embodiment of the present invention will be described with reference to some drawings. In the embodiment described in the following with reference to the drawings, parts same as those illustrated in FIG. 1 are denoted by the same reference numerals and will not be further described. FIG. 3 shows a mode in which the reflecting block 23 is eliminated. In this mode, the light source 19 is arranged in such a way that the axis of visible light emitted from the light source 19 directly passes the reflecting mirror part 3a. The visible light emitted from the light source 19 directly reaches the reflecting mirror part 3a without a change in the direction of its axis and travels through the optical path hole 5a after being transmitted through the reflecting mirror part 3a.

In the present invention, the light source 19 and the reflecting block 23 are arranged in such a way that the illuminating light or visible light is transmitted through the reflecting mirror part 3a to form a transmitted image. The substrate recognition camera 15 serving as image pickup means is arranged and driven in such a way as to pick up the transmitted image. The substrate recognition camera 15 picks up the transmitted light image. The position of the center of the reflecting surface of the reflecting mirror part 3a is determined using the transmitted image, or the center of intensity of the light coming from the reflecting surface is determined, and the optical element chip 2 is positioned in such a way as to be aligned therewith. Therefore, it is possible to position the chip 2 for mounting without need to additionally provide a specific light introducing part for light for positioning.

In the case of the first embodiment, it is possible to provide an illumination area extending wider than the visible light emission area of the light source 19 or to change the location of illumination by arranging the shape and location of the reflecting block 23. On the other hand, in the case of this embodiment, the illumination area is uniquely determined and the location of illumination is also determined by the characteristics of visible light emission of the light source 19, but the structure of the mounting table 17 can be made simpler, and it is possible to provide a mounting apparatus that is more cost-effective and easy to manufacture.

Figure 4:
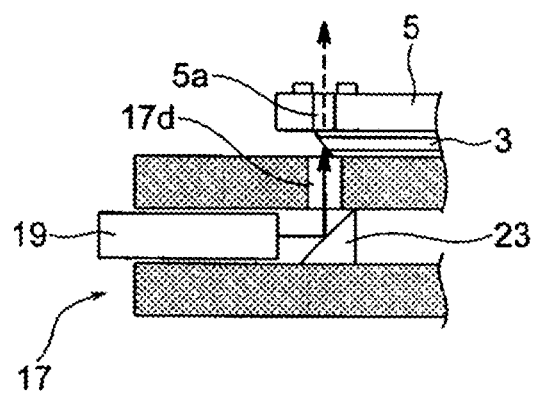
FIG. 4 is a diagram showing a relevant portion of a mounting apparatus according to still another embodiment of the present invention.

In FIG. 4, the transparent member 17b in the mounting table 17 has been eliminated, and the mounting table 17 is provided with a light passing part 17d that passes through the mounting table 17 from its back side, or the side of the space in which the light source 19 is arranged, to the front side and allows the visible light to travel through it. In this mode, as with the mode shown in FIG. 2, the location of illumination with visible light is limited to the location at which the light passing part 17d is provided. Therefore, this mode has lesser ease of adaptation to the wiring board 5 as compared to the mode shown in FIG. 1. However, while the transparent member 17c is typically made of a material that is hard to process, such as glass, the holding area 17a of the mounting table 17 in this embodiment can be made of a material that is easy to process, such as metal. In the present invention, as is the case with this embodiment, what is necessary for the holding area 17a of the mounting table 17 is to be able to transmit visible light as illumination light to the reflecting mirror part 3a. In other words, what is necessary is that the reflecting mirror part 3a is illuminated with illumination light through the holding area 17a.

While the light used in the above-described embodiment is visible light, the present invention is not limited by the use of visible light, but various types of light such as near infrared light may be used in accordance with specifications of the substrate recognition camera 15 or other specific conditions. What is necessary for the substrate recognition camera is to be an image pickup apparatus capable of capturing an appropriate transmitted light image with illumination light transmitted through the reflecting mirror part 3a. The image of the reflecting mirror part 3a actually captured with illumination is an image having a portion in which visible light is attenuated due to shadow of a portion corresponding to the mirror part and what is called an annular portion around the attenuated portion in which the intensity of the visible light is not decreased.

In other words, the image captured in this embodiment is composed of a transmitted light image formed by light transmitted through the reflecting mirror part 3a and a surrounding image formed by light illuminating the region around the reflecting mirror part 3a. With this image, the existing area of the reflecting mirror part 3a in the illumination area can be specified more clearly. Therefore, it is preferred that the illumination area for the reflecting mirror part 3a by the light source 19 be larger than the existing area of the reflecting mirror part 3a as the target of illumination. However, the present invention can also be carried out by picking up only a transmitted light image in the reflecting mirror part 3a.

Figure 5:
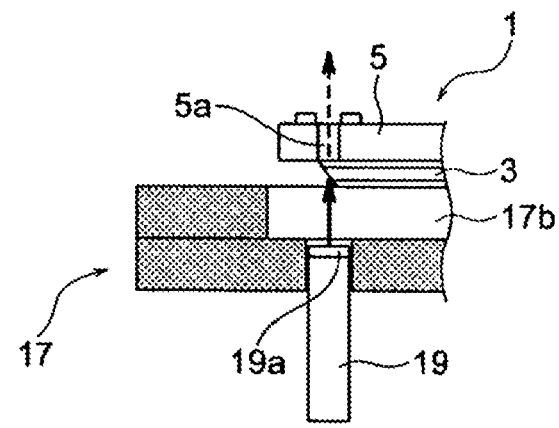
FIG. 5 is a diagram showing a relevant portion of a mounting apparatus according to still another embodiment of the present invention.

If there is a variation in the intensity of visible light in an vertical to the optical axis in the above-described illumination area, it can be difficult to determine the boundary in the image of the reflecting mirror part 3a. In view of this, it is preferred that the reflecting surface of the reflecting block 23 be a roughened surface having a light diffusing effect so that diffused light is delivered to the reflecting mirror part 3a. In the case of the embodiment shown FIG. 3, for example, a light diffusing plate 19a may be provided on the light emitting end of the light source 19, as shown in FIG. 5.

Visible light emitted from the light source 19 is diffused by the light diffusing plate 19a. Consequently, the light intensity distribution in the plane perpendicular to the optical axis becomes nearly uniform as the light travels to the reflecting mirror part 3a. This further facilitates determination of the outer contour of the reflecting mirror portion 3a. The light diffusing plate 19a and the above-described light diffusing surface provided on the reflecting surface of the reflecting block 23 serve as light diffusing means of the present invention. The light diffusing means is not limited to these illustrative modes, but other various known modes may be employed on condition that uniformity in the intensity of the illumination light delivered to the reflecting mirror part 3a in the plane perpendicular to the optical axis.

This application claims the benefit of priority from Japanese Patent Application NO. 2012-134903 filed on Jun. 14, 2012, which is hereby incorporated by reference herein in its entirety.

REFERENCE SIGNS LIST 1 substrate
2 chip
2a electrode
3 optical waveguide
3a reflecting mirror part
5 flexible printed wiring board
5a optical path hole
5b wiring
10 mounting apparatus
11 mounting nozzle
13 mounting head
15 substrate recognition camera
17 mounting table
17a holding area
17b transparent member
17c substrate suction hole
17d light passing part
19 light source
19a light diffusing plate
21 control means
23 reflecting block
25 chip supply nozzle

The invention claimed is:

1. A mounting apparatus for mounting an optical element on a wiring board provided with an optical waveguide having a reflecting mirror part on one side, said optical element being mounted on the other side of the wiring board, comprising:
   a mounting table configured to support said wiring board on a surface of a holding area to face the one side of said wiring board;
   a mounting nozzle configured to hold said optical element and mount said optical element on said wiring board;
   a light source configured to emit light for illuminating said reflecting mirror part of said wiring board supported by the holding area, through said holding area of said mounting table, and that is located opposite said wiring board with respect to the mounting table;
   an image pickup apparatus configured to image a mounting site of said optical element on said wiring board supported by the holding area; and
   a controller configured to determine a mounting position of said optical element based on an image picked up by imaging said reflecting mirror part illuminated by the light from said light source through said mounting table by said image pickup apparatus,
   wherein the image picked up by said image pickup apparatus is a transmitted light image formed by the light illuminating said wiring board through said mounting table transmitted through said reflecting mirror part,
   wherein said light source is located at a position where an optical path of the light illuminating said reflecting mirror part coincides with an optical path of an optical signal reflected by said reflecting mirror part, and where a point of maximum intensity of the light or a geometrical center of the light from the light source coincides with the point of maximum intensity of the optical signal reflected by said reflecting mirror part, in a state that said wiring board is supported by the holding area, and
   wherein the controller is configured to cause the mounting nozzle to mount said optical element on said wiring board on the basis of the point of maximum intensity of the light from the light source.

2. A mounting apparatus according to claim 1, wherein said image pickup apparatus configured to capture an image by picking up the transmitted light image formed by light transmitted through said reflecting mirror part and a surrounding image formed by light illuminating a portion surrounding the reflecting mirror part.

3. A mounting apparatus according to claim 1, wherein said holding area is made of a member that can transmit said light.

4. A mounting apparatus according to claim 1, further comprising a reflecting block configured to reflect light emitted from said light source to a direction through said reflecting mirror part to enable said image pickup apparatus to pick up an image of said reflecting mirror part.

5. A mounting apparatus according to claim 1, further comprising light diffusing means for changing light emitted from said light source into diffused light before the light reaches said reflecting mirror part.

6. A mounting method for mounting an optical element on a wiring board provided with an optical waveguide having a reflecting mirror part on one side, said optical element being mounted on the other side of the wiring board, comprising:
   holding said wiring board on a mounting table on a surface of a holding area such that the mounting table faces the one side of said wiring board;
   holding said optical element by a mounting nozzle;
   emitting light for illuminating said reflecting mirror part of said wiring board supported by the holding area, through said holding area of said mounting table, from a light source, the light source being located opposite said wiring board with respect to the mounting table;
   imaging a portion of said light transmitted through said reflecting mirror part of said wiring board supported by the holding area, by an image pickup apparatus to capture an image; and
   determining a mounting position of said optical element based on an image captured by said image pickup apparatus with a controller, based on an image picked up by imaging said reflecting mirror part illuminated by the light from said light source through said mounting table by said image pickup apparatus,
   wherein the image captured by said image pickup apparatus is a transmitted light image formed by light illuminating said wiring board through said mounting table transmitted through said reflecting mirror part,
   wherein said light source is located at a position where an optical path of the light from the light source illuminating said reflecting mirror part coincides with an optical path of an optical signal reflected by said reflecting mirror part, and where a point of maximum intensity of the light or a geometrical center of the light from the light source coincides with the point of maximum intensity of the optical signal reflected by said reflecting mirror part, in a state that said wiring board is supported by the holding area, and wherein the controller is configured to cause the mounting nozzle to mount said optical element on said wiring board on the basis of the point of maximum intensity of the light from the light source.

7. A mounting apparatus for mounting an optical element on a wiring board provided with an optical waveguide having a reflecting mirror part on one side, said optical element being mounted on the other side of the wiring board, comprising:

a mounting table configured to support said wiring board by a holding area;

a mounting nozzle configured to hold said optical element and mount said optical element on said wiring board;

a light source configured to emit light for illuminating said reflecting mirror part through said holding area of said mounting table;

an image pickup apparatus configured to image a mounting site of said optical element on said wiring board; and a controller configured to determine a mounting position of said optical element based on an image picked up by imaging said reflecting mirror part illuminated by said light source through said mounting table by said image pickup apparatus; and light diffusing means for changing light emitted from said light source into diffused light before the light reaches said reflecting mirror part, wherein the image picked up by said image pickup apparatus is a transmitted light image formed by light illuminating said wiring board through said mounting table transmitted through said reflecting mirror part.

8. A mounting apparatus for mounting an optical element on a wiring board provided with an optical waveguide having a reflecting mirror part on one side, said optical element being mounted on the other side of the wiring board, comprising:

a mounting table configured to support said wiring board on a surface of a holding area including an optically-transmitting area, to face the one side of said wiring board;

a mounting nozzle configured to hold said optical element and mount said optical element on said wiring board;

a light source that is located opposite said wiring board with respect to the mounting table, and configured to emit light for illuminating said reflecting mirror part of said wiring board supported by the holding area, through said optically-transmitting area;

an image pickup apparatus configured to drive with the mounting nozzle integrally, and image said reflecting mirror part which is illuminated by the light through the optically-transmitting area; and a controller configured to obtain a geometrical center of the image of said reflecting mirror part or a point of maximum intensity of the light, calculated by using the image of said reflecting mirror part, so as to control the mounting nozzle to mount said optical element onto a mount position on the wiring board, the mount position being determined based on the geometrical center or the point of maximum intensity.

* * * * *